May 21, 1957 — P. DE LA BRETEQUE — 2,793,179
METHOD OF RECOVERING GALLIUM FROM AN ALKALI ALUMINATE LYE
Filed June 11, 1956
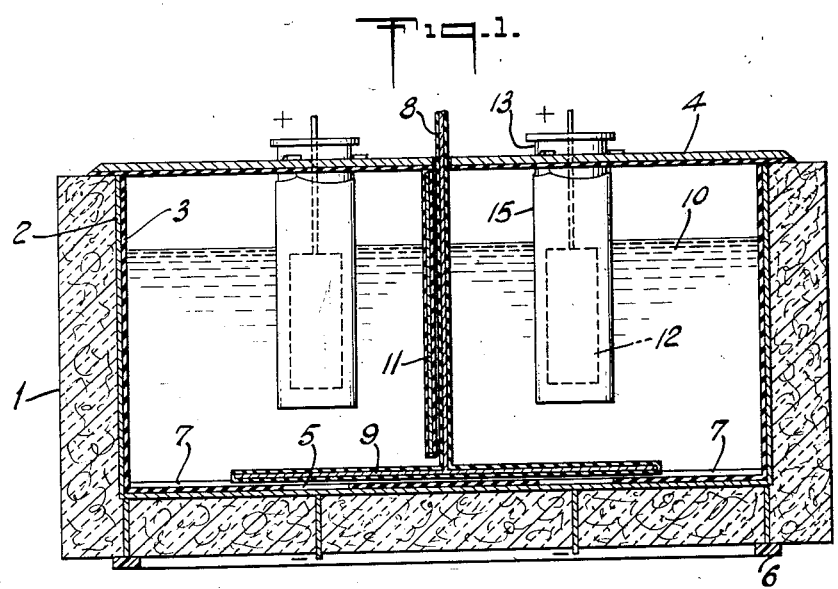
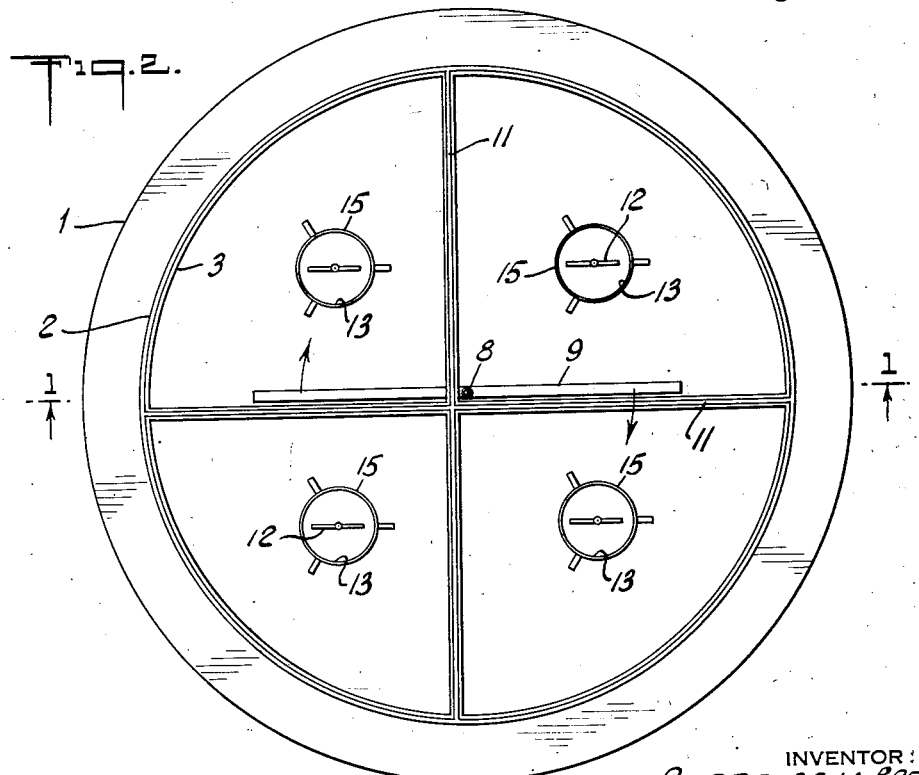
INVENTOR:
PIERRE DE LA BRETEQUE
BY
ATTORNEYS

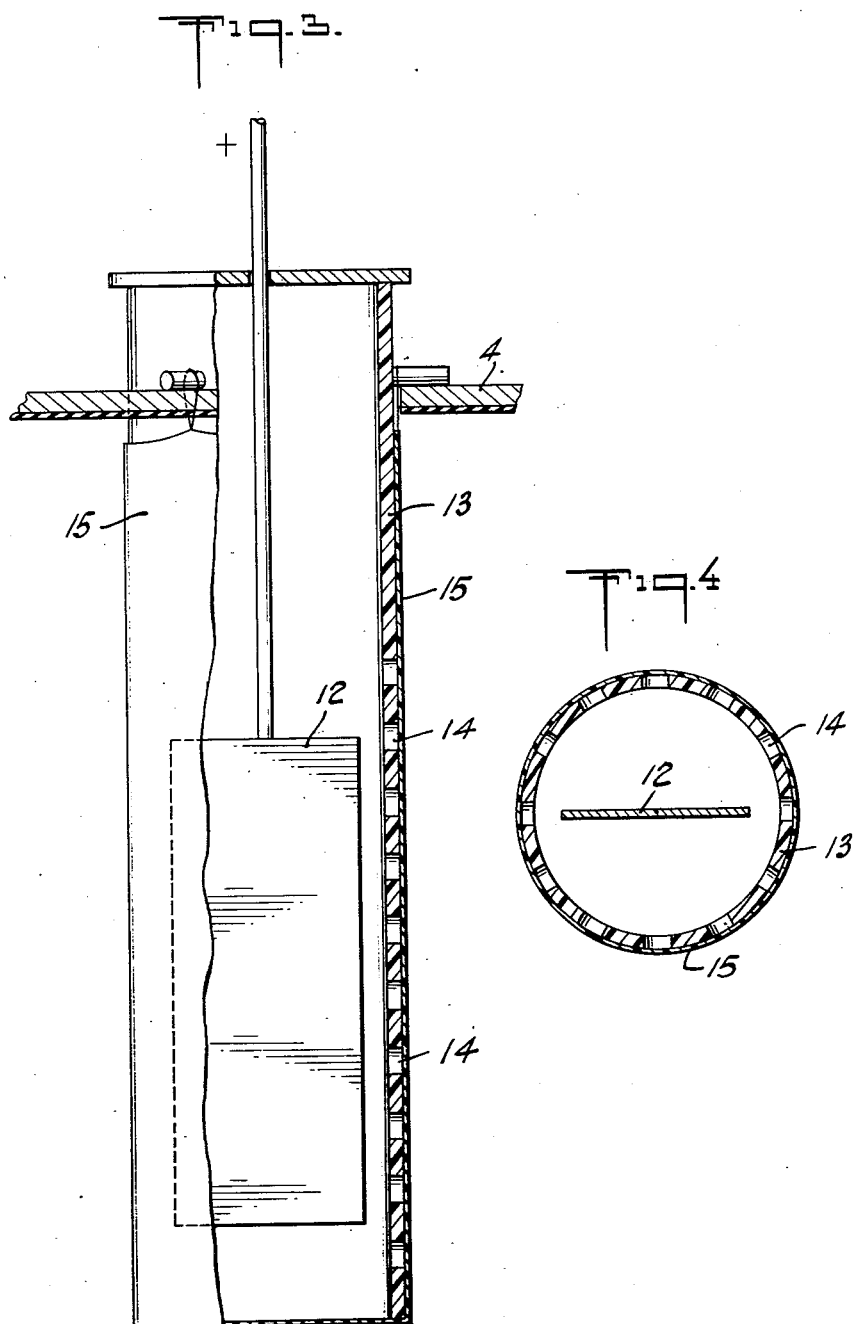

United States Patent Office 2,793,179
Patented May 21, 1957

2,793,179

METHOD OF RECOVERING GALLIUM FROM AN ALKALI ALUMINATE LYE

Pierre de la Breteque, Marseille-St. Louis, France, assignor to Société Anonyme pour l'Industrie de l'Aluminium, Chippis, Switzerland, a joint-stock company of Switzerland Application June 11, 1956, Serial No. 590,503

Claims priority, application Switzerland June 13, 1955

8 Claims. (Cl. 204—105)

My present invention relates to a method for recovering metallic gallium from sodium aluminate lye obtained in the course of recovering alumina from aluminum ores, for instance, during the carrying out of the Bayer process. This aluminate lye contains the gallium as sodium gallate.

The known processes for recovering gallium from sodium aluminate lyes involve a total or partial destruction of the aluminate lye. For instance, a known method prescribes the precipitation of a part of the alumina (more exactly: hydrate of alumina) and then a simultaneous precipitation of alumina and gallium oxide (as gallium hydroxide) by treatment with carbon dioxide. The precipitate obtained is redissolved in caustic soda, if necessary, after heating to 350-600° C., in order to destroy the organic substances. Finally, the solution is electrolized in order to deposit metallic gallium.

Another method prescribes first of all the precipitation of a large part of the alumina as calcium aluminate and thereafter the treatment of the remaining aluminate lye with carbon dioxide as in the preceding example.

According to a more recent method, the sodium aluminate lye is treated with hydrofluoric acid, which causes the precipitation of the largest part of the aluminum as cryolite, whereas 70 to 80% of gallium remains in the solution.

In all the known methods, the recovery of the gallium oxide (or gallium hydroxide) requires operations, which interfere with the normal sequence of the operations during the recovery of alumina according to the usual processes. On the other hand, all these known methods involve the destruction of the aluminate lye, which therefore cannot be reintroduced into the cycle of operations without further treatment. My process, on the contrary, makes possible the purification of aluminate lyes without destroying or altering the same.

My present invention comprises a sequence of three operations.

The first of these operations consists in electrolyzing the aluminate lye by means of a cathode formed by stirred liquid mercury and of an anode made from a metal which is insoluble under the conditions of the electrolysis, the terminal voltage (overall voltage) being at least 3 volts, the cathodic potential at least 1.6 volts and the current density at the cathode at least 0.35 ampere per square decimeter. One applies preferably a terminal voltage of 3.8 to 4.2 volts, or better of 3.8 to 4.0 volts, a cathodic potential of 1.9 to 2.2 volts and a current density at the cathode of 0.45 to 0.60 ampere per square decimeter. The gallium is deposited in the metallic state at the cathode. The deposit in question is probably a dispersion of gallium in mercury, and does not form an amalgam with the mercury.

A slow circulation of the mercury of the cathode will not render the process practicable. One needs a rather strong stirring, which acts chiefly on the surface of the mercury but without rupturing the continuity of said surface. In other words, one must avoid pulverizing the mercury with formation of droplets and must not create a gyratory motion causing an interruption in continuity at the surface of the cathode. If the stirring is not sufficiently strong, the purpose of the process is not attained. The variation of the number of revolutions of the stirrer from the single to the double or inversely may cause a variation of the yield (calculated on the basis of the gallium deposit) from one to ten or inversely. Without stirring, the gallium deposit is insignificant. The anode can be made of nickel, which is particularly advantageous because of its low oxygen supertension.

The second operation consists in extracting the gallium from the mercury by means of a caustic alkali solution, for instance of caustic soda solution. It is advantageous to favor the dissolution of gallium by dipping iron pieces into the mercury.

The third operation consists in electrolyzing the alkali gallate solution obtained during the second operation in order to recover metallic gallium in the free state according to the known process which is described for instance in the French Patent No. 964,009 and in the book "Das Gallium" by E. Einicke, published 1937 by Leopold Voss in Leipzig (Germany) and reprinted by Edward Brothers Inc. at Ann Arbor, Michigan, in the year 1944, pages 52 to 54.

Between these three operations, which represent the essence of the invention, it is of course possible to intercalate operations such as a quick washing of the mercury, a filtering of the sodium gallate solution and so on.

An apparatus for carrying out a process in accordance with the present invention is shown in the accompanying drawings. In these drawings, Fig. 1 is a diagrammatic vertical section taken on lines 1—1 of Fig. 2, through an electrolytic apparatus for carrying out a process in accordance with the present invention;

Fig. 2 is a top plan view of the electrolytic apparatus of Fig. 1, but shown with the cover removed;

Fig. 3 is a side view with parts broken away of the anode assembly forming part of the electrolytic apparatus of Fig. 1 but shown on a larger scale; and Fig. 4 is a transverse section of the anode assembly of Fig. 3.

The following example for carrying out the first operation of the process according to my invention is not intended to restrict the scope of the same.

Four litres of an undecomposed sodium aluminate lye issued from a plant applying the Bayer process for the recovery of alumina from red bauxite are introduced into a cylindrical vessel made from Pyrex-glass having a flat bottom of 16 cm. diameter covered with liquid mercury which forms a cathode having a surface of 2 dm.$^2$ (square decimeters). The aluminate lye, the temperature of which is 50° C., is submitted to the electrolysis, a plate of pure nickel being vertically suspended therein with a total submerged surface of 5 cm.$^2$ to act as an anode. The terminal voltage varies between 3.8 and 3.9 volts; it is regulated in such a manner, that the current density at the cathode is 0.45 ampere per dm.$^2$, which corresponds to an intensity of 0.9 ampere. The cathodic potential measured during the electrolysis is 1.9 volt compared with the hydrogen electrode. The mercury cathode is stirred by means of a glass agitator having the form of an inverted T, the horizontal part of which sweeping the whole mercury surface dips by 2 to 3 mm. (height) into the same. The speed of this agitator is two revolutions per second.

The aluminate lye used contains 140 grams $Na_2O$ total and 110 grams $Al_2O_3$ in one litre, and further

|  | Before treatment | After 12 hours electrolysis | After 24 hours electrolysis |
|---|---|---|---|
| $Na_2CO_3$ ---------- grams/litre | 13.8 | 13.8 | 13.8 |
| $SiO_2$ ------------------- do | 0.61 | 0.52 | 0.48 |
| $V_2O_5$ ------------------- do | 0.57 | 0 | 0 |
| $Cr_2O_3$ ------------------ do | 0.078 | 0 | 0 |
| $Fe_2O_3$ ------------------ do | 0.0088 | 0 | 0 |
| $P_2O_5$ ------------------- do | 0.56 | 0.52 | 0.52 |
| Organic substances ----- do | 1.60 | 1.50 | 1.50 |
| Ga ------------------------ do | 0.214 | 0.120 | 0.025 |

After 12 hours electrolysis, the current consumption is 10 watt-hours per litre of lye and after 24 hours 20 watt-hours per litre of lye.

The industrial electrolysis may be carried out for example in sheet iron vessels coated with a suitable artificial resin. The mercury may be stirred by means of usual mechanical agitators, but it is also possible to apply physical methods; one may for instance think of ultrasonic waves.

The following example relates to the carrying out of the process on an industrial scale:

Referring to the drawings, 450 litres of an undecomposed sodium aluminate lye obtained from a plant applying the Bayer process for recovering alumina from red bauxite are introduced into a cylindrical vessel 1 made from 10 mm. thick steel sheet 2 by welding and provided inside with a 4 mm. thick coating 3 of ebonite. On the bottom of the vessel 1, four round spots of 15 cm. diameter are left uncoated for the cathodic current supply. The vessel 1 is heat-insulated and in addition is electrically insulated by means of a 10 mm. thick ring 6 of plastic material (Bakelite) on which it rests. The bottom of the vessel 1 can be adjusted horizontally by means of 3 adjusting screws (not shown). The vessel 1 is closed with a cover 4 made of iron sheet and provided with an ebonite coating. Near the bottom, there is an outlet cock for the mercury (not shown).

The vessel is 0.60 m. high and has an inner diameter of 1.13 m., so that the cathode surface formed by a layer 7 of about 10 litres mercury covering the bottom of the vessel is 1m.². The height of the mercury layer is 1 cm.

The vessel 1 is provided with an agitator 8 having the form of an inverted T made from 1 cm. thick iron rod covered with rubber. In order to reduce the mercury losses due to pulverization, the arms 9 of the agitator have only a length of 40 cm. each; they dip by 2 to 3 mm. (height) into the mercury layer and the speed is 30 revolutions per minute. In order to prevent the lye 10 from being carried along by the agitator 8 and from rotating therewith, two vertical partition walls 11 made from sheet iron covered with ebonite are disposed crosswise in the vessel 1. The lower ends of these walls 11 are about 5 cm. above the bottom mercury surface.

Each of the four compartments formed in the vessel 1 by the partition walls 11 is provided with an anode 12 made from annealed sheet nickel 100 mm. wide, 250 mm. long and 1 mm. thick. These anodes are welded to 5 mm. thick nickel rods for the current supply. Each anode is surrounded by a hollow cylinder 13 made from synthetic resin and having an inner diameter of 12.5 cm., as shown. The cylinder 13 is suspended in any conventional way, e. g. as shown in the figures. This hollow cylinder 13 is provided with 8 horizontal rows of round holes 14 of 20 mm. diameter forming 10 vertical rows. The hollow cylinders 13 are 50 cm. long and each one introduced into a sack 15 made from synthetic resin woven pervious cloth sold under the trade name Rilsan (Rilsan is a polyamide plastic). Of course other plastics (synthetic resins) or other substances can be used instead of Rilsan for making the pervious diaphragm. The hollow cylinders 13 have no bottom but are closed at the lower end by the plastic sack 15. The lower end of each anode is about 20 cm. over the bottom of the vessel. The total anodic surface is nearly 18 cm.².

If necessary, the aluminate lye 10 is heated before being introduced into the electrolysis vessel 1 by means of steam passing through a jacket surrounding the supply pipe or in any other way. The temperature during the purification electrolysis should be 50° C.±2° C. As the duration of the purification electrolysis lasts many hours, the aluminate lye would noticeably cool, although the vessel 1 is heat insulated and provided with a cover. It is therefore necessary to supply heat to the aluminate lye during the electrolysis. In the present example, this is done by means of an electric immersion heater surrounded by a protecting tube made from Pyrex-glass (not shown). The power of this heater is 1300 watts. Of course, this heater must not be in operation all the time during the electrolysis; during a period of 11 hours it is about 4 hours in operation.

A terminal voltage of 4 volts is applied. The anodic density is about 3 amperes per dm.². The cathodic potential is maintained between 1.9 and 2.2 volts compared with the hydrogen electrode and the current density at the cathode between 0.45 to 0.60 ampere per dm.². The duration of the electrolysis is 18 hours; the electrolysis current consumption during these 18 hours is 4000 watt-hours, the electrolysis current consumption being therefore about 8.8 watt-hours per litre. The aluminate lye used contains 140 grams of $Na_2O$ total and 110 grams $Al_2O_3$ in one litre and further:

|  | Before treatment | After 6 hours electrolysis | After 12 hours | After 18 hours | After 24 hours |
|---|---|---|---|---|---|
| $Na_2CO_3$ ---------- g./litre | 12.7 | 12.7 | 12.7 | 12.7 | 12.7 |
| $SiO_2$ ------------------- do | 0.580 | 0.560 | 0.540 | 0.528 | 0.500 |
| $V_2O_5$ ------------------- do | 0.67 | 0.08 | 0 | 0 | 0 |
| $Cr_2O_3$ ------------------ do | 0.056 | 0 | 0 | 0 | 0 |
| $Fe_2O_3$ ------------------ do | 0.018 | 0 | 0 | 0 | 0 |
| $P_2O_5$ ------------------- do | 0.6 | 0.6 | 0.6 | 0.6 | 0.6 |
| Organic substances -- do | 1.54 | 1.54 | 1.54 | 1.54 | 1.54 |
| Ga ------------------------ do | 0.145 | 0.129 | 0.093 | 0.061 | 0.034 |

0 gram/litre means for $V_2O_5$ less than 0.01 gram/litre, for $Cr_2O_3$ less than 0.005 gram/litre and for $Fe_2O_3$ less than 0.001 gram/litre.

If the terminal voltage is lower than 3 volts, the yield of the operation becomes insignificant. One applies preferably a terminal voltage of 3.8 to 4.2 volts; the optimum lies between 3.8 and 4.0 volts. A tension over 4.2 volts causes an increase in consumption of current without an equivalent increase of the yield.

One may regulate the terminal voltage by varying the anodic surface, the cathodic current density remaining constant. However, I have found that it is very advantageous to use a plastic cloth diaphragm 15 surrounding the anode; this allows the anodic surface to be increased at will and therefore the current density to be decreased. The diaphragm 15 hinders the diffusion of the anodic liquid and therefore the reoxidation of the precipitate. It does not cause any noticeable increase of the bath tension (that is to say of the resistance of the bath).

If the cathode potential is lower than 1.6 volts, the gallium is not deposited. Preferably, there is employed a cathodic potential of about 1.9 to 2.2 volts to insure the deposit of gallium. The cathodic potential is regulated automatically if one takes care to maintain the prescribed current density at the cathode.

On the laboratory scale, the best yield is obtained between 40 to 60° C. It is generally the temperature of the Bayer aluminate lyes before or after decomposition. On the industrial scale, I have found that the optimum temperature is 50° C.±2° C. I have found that on the industrial scale, the yield decreases considerably if the temperature drops. At 37° C., the yield is by 50% smaller than at 50° C.

The deposit of gallium is rather proportional to the duration of the electrolysis. By prolonging the duration, one may recover substantialy all of this element. However, as under the conditions mentioned in the examples, the compounds of vanadium and chromium are totally eliminated from the aluminate lye already after 4 or 5 hours, and as the diminution of the iron is fast, it may be preferable to interrupt the electrolysis in the laboratory scale after about 5 hours, as the vanadium is then wholly eliminated. The gallium which is not deposited will remain soluble in the aluminate lye, which is subjected to a new purification electrolysis in the subsequent cycle of operations, and will therefore not be lost. However, the duration of the purification electrolysis will vary according to the volume of the lye and its concentration. On the industrial scale, it will be preferable to extend the duration of the electrolysis to about 18 to 24 hours in order to diminish the number of operations of draining, washing, filling up and so on.

The electrolysis can be carried out not only in batches, but also in a channel provided with electrolysis and stirring devices.

The same quantity of mercury can be used for an indefinite number of electrolysis operations, as the gallium accumulates in the mercury. But I have found that it is advantageous to enrich the mercury only when the gallium contents reaches one percent. If the gallium concentration is greater, it seems that a partial pulverization of the mercury takes place and perhaps also a partly redissolution of the gallium.

The first operation of my process can be applied indifferently to aluminate lyes of any concentration and as well before as after decomposition, that is to say as well before as after precipitation of the hydrate of alumina. If the first operation is applied before decomposition, the aluminate lye, which is at the same time freed from the whole iron content, gives an alumina of very high purity. Theoretical considerations allow the conclusion that the yield decreases at very high concentrations, but in practice, no noticeable decrease could be detected. Before extracting the gallium from the mercury, it is recommended to free the mercury from the rest of the aluminate lye by washing it quickly with water, for instance by dropping it in form of a rain into a cold water column.

The second operation of the process according to my invention, that is to say the extraction of the gallium deposit from the mercury by means of caustic alkali, is favoured by a temperature increase. It is advantageous to make the extraction in the neighberhood of the boiling point. At room temperature, the attack is very low. In practice, I use a solution of caustic soda. If the gallium content of the mercury is very low, the little quantity of sodium which has deposited at the cathode may be sufficient, after having reacted with the water, to dissolve the gallium. In both cases, the dissolution is favoured by the presence of metallic pieces, for instance of iron pieces, which are simultaneously in contact with the mercury and with the solution. I have found that it is advantageous to extract the gallium in a vessel made from stainless steel (18/8+2.5 percent molybdenum) without dipping iron pieces into the mercury. The catalysis takes place at the wall of the vessel and the stainless steel is not corroded; the mercury is no more contaminated by the iron pieces.

It is advantageous to regulate the caustic soda content in such a way that the molecular ratio $Na_2O:Ga_2O_3$ is between 1.5:1 and 2:1 in the obtained solution.

The third operation of the process according to my invention is known per se. It may be carried out advantageously in the following way: After filtering, the solution of sodium gallate is electrolyzed under the following conditions:

Gallium concentration of the solution: 120–200 grams per litre
Anode made from pure nickel
Cathode made from stainless steel
Terminal voltage: 3.8 to 4.0 volts
Current density at the anode: 5 amperes per square decimeter
Current density at the cathode: 100 amperes per square decimeter
Temperature: 70° C.
Stirring of the solution: moderate If the temperature drops below 70° C., there is the danger that the gallium dropping on the bottom of the electrolysis vessel becomes pulverized.

The 6 first tenths of gallium deposit with a current yield of 40 to 50%, the 9 first tenths with a yield of over 30%. In other words, when depositing 60% of the gallium contained in the sodium gallate solution, the yield is 40 to 50% calculated on the basis of the current consumption; when depositing 90%, the yield is still over 30%.

What is claimed is:

1. A method of recovering metallic gallium from an alkali aluminate lye obtained in the course of recovering alumina from aluminum ores, comprising electrolyzing the said aluminate lye by the action of a cathode of liquid mercury and of at least one anode made from a metal which is insoluble under the conditions of the electrolysis, to cause the gallium to be deposited in the metallic state at the cathode, extracting the gallium from the mercury by means of a caustic alkali to obtain a solution of alkali gallate, and electrolyzing the solution of alkali gallate to obtain metallic gallium in the free state.

2. A method of recovering metallic gallium from an alkali aluminate lye as described in claim 1, wherein the aluminate lye is sodium aluminate lye.

3. A method of recovering metallic gallium from a sodium aluminate lye obtained in the course of recovering alumina from aluminum ores, comprising electrolyzing the said aluminate lye by the action of a cathode of stirred liquid mercury and of at least one anode made from a metal which is insoluble under the conditions of the electrolysis, the terminal voltage for the electrolytic step being at least 3 volts, the cathodic potential being at least 1.6 volts, and the current density at the cathode being at least 0.35 ampere per square decimeter, extracting the gallium from the mercury by means of a caustic alkali to obtain a solution of alkali gallate, and electrolyzing the solution of alkali gallate to obtain metallic gallium in the free state.

4. A method of recovering metallic gallium from a sodium aluminate lye as described in claim 3, wherein the step of electrolyzing the aluminate lye is carried out with a terminal voltage of 3.8 to 4.2 volts, a cathodic potential of 1.9 to 2.2 volts, and a current density at the cathode of 0.45 to 0.60 ampere per square decimeter.

5. A method of recovering metallic gallium from a sodium aluminate lye as described in claim 3, wherein the electrolysis of the sodium aluminate lye is carried out at a temperature of 40 to 60° C.

6. A method of recovering metallic gallium from a sodium aluminate lye as described in claim 3, wherein each of the anodes in the step of electrolyzing the sodium aluminate lye is surrounded by a pervious diaphragm.

7. A method of recovering metallic gallium from a sodium aluminate lye as described in claim 3, wherein the step of extracting the gallium from the mercury by means of a caustic alkali is carried out at an elevated temperature.

8. A method of recovering metallic gallium from a sodium aluminate lye as described in claim 3, wherein the step of extracting the gallium from the mercury by means of a caustic alkali is carried out at the boiling point.

References Cited in the file of this patent

UNITED STATES PATENTS 2,582,377   Brown _____ Jan. 15, 1952

OTHER REFERENCES

"Amalgammetallurgie," by John, January-February 1948, pp. 15–30.